(12) United States Patent
Ostrowski et al.

(10) Patent No.: US 7,750,191 B2
(45) Date of Patent: Jul. 6, 2010

(54) METHOD FOR PRODUCING POLYETHER ALCOHOLS

(75) Inventors: Thomas Ostrowski, Mannheim (DE); Stephan Bauer, Ostercappeln (DE); Achim Loeffler, Speyer (DE); Juergen Winkler, Schwarzheide (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 203 days.

(21) Appl. No.: 11/570,794

(22) PCT Filed: Jun. 22, 2005

(86) PCT No.: PCT/EP2005/006717
§ 371 (c)(1),
(2), (4) Date: Dec. 18, 2006

(87) PCT Pub. No.: WO2006/002807
PCT Pub. Date: Jan. 12, 2006

(65) Prior Publication Data
US 2007/0225394 A1 Sep. 27, 2007

(30) Foreign Application Priority Data
Jun. 30, 2004 (DE) ................ 10 2004 031 836

(51) Int. Cl.
*C07C 43/00* (2006.01)
*C08G 18/00* (2006.01)

(52) U.S. Cl. ............... 568/679; 521/170; 521/174; 568/606; 568/619; 568/620

(58) Field of Classification Search ........... 568/606, 568/619, 620, 679; 521/170, 174
See application file for complete search history.

(56) References Cited

U.S. PATENT DOCUMENTS 3,879,315 A * 4/1975 Watkinson et al. .......... 521/130
5,689,012 A    11/1997 Pazos et al.
6,362,126 B1   3/2002 Grosch et al.
7,022,884 B2   4/2006 Ostrowski et al.
2003/0004378 A1  1/2003 Ostrowski et al.
2003/0013920 A1  1/2003 Ostrowski et al.
2003/0013921 A1  1/2003 Ostrowski et al.

FOREIGN PATENT DOCUMENTS

| | | |
|---|---|---|
| DE | 203 735 | 12/1981 |
| DE | 203 725 | 11/1983 |
| JP | 6-16806 | 1/1994 |
| WO | WO 99/44739 | 9/1999 |
| WO | WO 00/14143 | 3/2000 |
| WO | WO 01/16209 A1 | 3/2001 |
| WO | WO 01/62824 A1 | 8/2001 |
| WO | WO 01/62825 A1 | 8/2001 |
| WO | WO 01/62826 A1 | 8/2001 |

* cited by examiner

*Primary Examiner*—Mark Eashoo
*Assistant Examiner*—Melissa Rioja
(74) *Attorney, Agent, or Firm*—Oblon, Spivak, McClelland, Maier & Neustadt, L.L.P.

(57) ABSTRACT

The invention provides a process for continuously preparing polyether alcohols by adding alkylene oxides to H-functional starter substances using a DMC catalyst, comprising the steps of a) preparing a precursor by continuously metering an H-functional starter substance, an alkylene oxide or a mixture of at least two alkylene oxides and the required amount of DMC catalyst into a continuous reactor, b) continuously withdrawing the precursor from step a) from the reactor, c) continuously metering the product from step a), an alkylene oxide different from that in step a) or a mixture of at least two alkylene oxides different from that in step a) and, if appropriate, the required amount of DMC catalyst into a further continuous reactor.

17 Claims, No Drawings

METHOD FOR PRODUCING POLYETHER ALCOHOLS

The invention provides a continuous process for preparing polyether alcohols by polymerizing alkylene oxides using multimetal cyanide compounds as catalysts.

Polyether alcohols have been known for some time and are prepared industrially in large amounts. Usually, they are used as a starting compound for the preparation of polyurethanes by reacting with polyisocyanates.

The catalysts used for preparing polyether alcohols have in recent times frequently been multimetal cyanide compounds, also known as DMC catalysts. The use of DMC catalysts minimizes the content of unsaturated by-products, and the reaction also proceeds, compared with the customary basic catalysts, with a distinctly higher space-time yield.

A further advantage of the DMC catalysts is what is known as the differential catalysis. This means that the alkylene oxides are added preferentially onto molecules having low molar mass in the course of the reaction. This enables the continuous preparation of polyether alcohols in reactors having ideal mixing.

Processes for continuously preparing polyether alcohols using DMC catalysts are also known. For instance, WO 98/03571 describes a process for continuously preparing polyether alcohols by means of DMC catalysts, in which a continuous stirred tank is initially charged with a mixture of a starter and a DMC catalyst, the catalyst is activated and further starter, alkylene oxides and DMC catalyst are added continuously to this activated mixture and on attainment of the desired fill level of the reactor, polyether alcohol is drawn off continuously.

JP H6-16806 likewise describes a process for continuously preparing polyether alcohols by means of DMC catalysts in a continuous stirred tank or in a tubular reactor, in which an activated starter substance mixture is initially charged at the inlet and alkylene oxide is metered in at various points in the tubular reactor.

DD 203 725 also describes a process for continuously preparing polyether alcohols by means of DMC catalysts, in which an activated starter substance mixture is initially charged at the inlet of a tubular reactor and alkylene oxide is metered in at different points in the tubular reactor.

WO 01/628262 WO 01/65824 and WO 01/63825 describe specific reactors for the continuous process for preparing polyether alcohols by means of DMC catalysts.

A disadvantage of all of the processes described for continuously preparing polyether alcohols is that the structure of the polyether chain cannot be varied. It is only possible to add on one alkylene oxide or a given mixture of alkylene oxides.

WO 00/14143 and WO 99/44739 describe DMC catalysts which are applied to solid supports or shaped to shaped bodies. It is likewise possible by means of these catalysts to continuously prepare polyether alcohols, for example when the catalysts are arranged in a fixed bed. WO 99/44739 states that the reaction can be effected in a plurality of sections arranged in series. However, the preparation of the DMC catalysts in the configuration described in these documents is laborious, and the lifetimes of catalysts supported in this way are insufficient. Such processes have therefore not become established in industry.

For many fields of use of polyether alcohols prepared by means of DMC catalysts, it is necessary to modify the polyether chain, especially at the chain end. The polyetherols used for the production of flexible polyurethane foams typically have polyether chains having a mixture of ethylene oxide and propylene oxide. Especially for the use of the polyether alcohols in flexible slabstock foams, preference is given in the case of DMC polyether alcohols to adding propylene oxide onto the chain end in order to adjust the reactivity of the polyether alcohols in the production of the foams. Such polyether alcohols are described, for example, in WO 01/16209. These structures cannot be produced continuously by the prior art processes.

It is an object of the invention to develop a simple and inexpensive process which enables the continuous preparation of polyether alcohols having at least two segments of different structure in the polyether chain.

This object is achieved by, in a conventional process by continuous addition of starter substance, at least one alkylene oxide and DMC catalyst, reacting the precursor withdrawn from the continuous reactor with one alkylene oxide or a mixture of at least two alkylene oxides in a further continuous reactor, the alkylene oxides or the mixtures of at least two alkylene oxides being different in the different reactors.

The invention thus provides a process for continuously preparing polyether alcohols by adding alkylene oxides to H-functional starter substances using a DMC catalyst, comprising the steps of a) preparing a precursor by continuously metering at least one H-functional starter substance, an alkylene oxide or a mixture of at least two alkylene oxides and the required amount of DMC catalyst into a continuous reactor, b) continuously withdrawing the precursor from step a) from the reactor, c) continuously metering the product from step a) an alkylene oxide different from that in step a) or a mixture of at least two alkylene oxides different from the mixture in step a) and, if appropriate the required amount of DMC catalyst into a further continuous reactor d) continuously withdrawing the product from step c) from the reactor.

Preferably between 50 and 98% by weight more preferably from 80 to 98% by weight and in particular from 83 to 97% by weight of the entire amount of alkylene oxides used is used in process step a) and the remainder of the alkylene oxide is used in process step c) the amounts of the alkylene oxides used in stages a) and c) adding up to 100% by weight.

In stage a) preference is given to using a mixture of ethylene oxide and propylene oxide. The ratio of propylene oxide to ethylene oxide is preferably between PO:EO=30:70 and PO:EO=98:2.

In stage c) one or more alkylene oxides are metered in. The alkylene oxide or the mixture of the alkylene oxides is different from the alkylene oxide or the mixture of the alkylene oxides in stage a).

The type and composition of the alkylene oxides or mixtures of at least two alkylene oxides used in stages a) and c) depend upon the desired intended use of the polyether alcohols.

In a preferred embodiment of the process according to the invention a mixture of ethylene oxide and propylene oxide in a weight ratio of propylene oxide to ethylene oxide of from PO:EO=60:40 to PO:EO=95:5 is used in stage a) in an amount of 70-95% by weight based on the amount of the alkylene oxide used and propylene oxide is used in stage c). Such polyether alcohols are used in particular for producing flexible polyurethane slabstock foams.

In a further preferred embodiment of the process according to the invention a mixture of ethylene oxide and propylene oxide in a weight ratio of propylene oxide to ethylene oxide of from PO:EO=60:40 to PO:EO=95:5 is used in stage a) in an amount of 50-95% by weight based on the amount of alkylene oxide used and a mixture of ethylene oxide and propylene oxide is used in stage c) in a weight ratio of propylene oxide to ethylene oxide of PO:EO=80:20 to PO:EO=20:80. Such polyether alcohols are used in particular for producing molded flexible polyurethane foams.

In a further preferred embodiment of the process according to the invention, pure propylene oxide is used in stage a) in an amount of 50-95% by weight based on the total amount of the alkylene oxide, and a mixture of propylene oxide and ethylene oxide is used in the second stage in a weight ratio of propylene oxide to ethylene oxide of from PO:EO=80:20 to PO:EO=20:80. Such polyether alcohols are likewise used for producing molded flexible polyurethane foams.

The reactors used for the two stages of the reaction may be identical or different reactors. Preferred reactors are continuous stirred tanks, tubular reactors, or flow or loop reactors.

Such reactors are described, for example, in JP H6-16806, DD 207 253, WO 01/62826, WO 01/62825 and WO 01/62824.

In a preferred embodiment of the process according to the invention, continuous stirred tanks are used in stages a) and c). Both reactors may be of identical design. However, since different amounts of heat are released in the two stages mentioned of the process owing to the different use amounts of the alkylene oxides, the two reactors used may be cooled in different ways. While preference is given to using a stirred tank with external heat exchanger in stage a), as, for example, in WO 01/62825, it is possible in stage c) to use a reactor having inexpensive internal cooling, especially internal cooling coils.

WO 01/62824 describes a stirred tank reactor having internal heat exchanger plates. It is also possible to use this reactor type.

In addition to conventional stirred tank reactors, it is also possible to use jet loop reactors having a gas phase and external heat exchangers, as described, for example, in EP 419 419, or internal heat exchanger tubes as described in WO 01/62826. In addition, it is possible to use gas phase-free loop reactors.

In the course of the metering of the reactants, it is necessary to ensure good distribution of the reactants, i.e. of the alkylene oxides, starter and catalyst suspension. This may be effected in the case of stirred tank reactors by the use of ring distributors which are incorporated below the stirrer or between the plane of the first and of the second stirrer.

In order to ensure that the alkylene oxide has been depleted fully after leaving the second reactor c), it is possible for a tubular reactor, as described in WO 03/025045, to be connected downstream of the second reactor, it is not necessary to deplete the entire amount of alkylene oxide metered into step a) before entry into the reactor of step c).

Preference is given to conducting the reaction in such a way that the content of the free alkylene oxide present in the reactor is less than or equal to 8% by weight, based on the entire amount of reactants and reaction products present in the reactor. In this method, the proportion of very high molecular weight by-products which have a disruptive effect in foam production is suppressed.

The product from step c) is typically worked up after the withdrawal d). The workup includes, for example, the removal of volatile constituents, typically by vacuum distillation, steam or gas stripping and/or other methods of deodorization. It is advantageous in this case to carry out the stripping immediately after the metering of the alkylene oxides, but if possible not later than 12 hours after the completion of the metering of the alkylene oxides. If necessary, a filtration may also be effected. Volatile secondary components may be removed either batchwise or continuously. In the present process, a continuous removal of the odorous substances should be undertaken.

It is possible to remove the catalyst from the polyether alcohol. However, it can remain in the polyether alcohol for most fields of use. It is possible in principle, although not preferred, to remove the DMC catalyst and reuse it in step a), as described, for example, in WO 01/38421. However, this process is usually too costly and inconvenient for the industrial scale preparation of polyether alcohols.

It is also customary to stabilize the polyether alcohol against thermooxidative degradation. This is effected typically by the addition of stabilizers, usually sterically hindered phenols and/or amines. Preference is given to not using aminic stabilizers.

The starter substances used are H-functional compounds. In particular, alcohols having a functionality of from 1 to 8, preferably from 2 to 8, are used. To prepare polyether alcohols which are used for flexible polyurethane foams, the starter substances used are in particular alcohols having a functionality of from 2 to 6, in particular of 2 and 3. Examples are glycerol, diglycerol, butanediol, diethylene glycol, triethylene glycol, dipropylene glycol, tripropylene glycol, sorbitol, trimethylolpropane and castor oil. In the addition of alkylene oxides by means of DMC catalysts, it is advantageous to use, together with or instead of the alcohols mentioned, the reaction products thereof with alkylene oxides, especially propylene oxide. Such compounds preferably have a molar mass of up to 500 g/mol. The addition of the alkylene oxides in the preparation of these reaction products may be effected with any catalysts, for example with basic catalysts. The polyether alcohols for the production of flexible polyurethane foams usually have a hydroxyl number in the range between 5 and 400 mgKOH/g, preferably 35 and 60 mgKOH/g.

To produce flexible polyurethane slabstock foams, preference is given to using polyether alcohols having a high content of secondary hydroxyl groups and a maximum content of ethylene oxide units in the polyether chain of 30% by weight, based on the weight of the polyether alcohol. When these polyether alcohols are prepared by means of DMC catalysis, they preferably have a propylene oxide block at the chain end. For the production of molded flexible polyurethane foams, polyether alcohols having a high content of primary hydroxyl groups and an ethylene oxide end block in particular are used in an amount of <20% by weight, based on the weight of the polyether alcohol.

The alkylene oxides are added on under the customary conditions, at temperatures in the range from 60 to 180° C., preferably between 90 and 140° C., in particular between 100 and 130° C., and pressures in the range from 0 to 20 bar, preferably in the range from 0 to 10 bar and in particular in the range from 0 to 5 bar. The process steps under a) and c) may be performed at identical or different temperatures. The mixture, initially charged in the reactor at the start of the reaction, of starter substance and DMC catalyst may be pretreated by stripping in accordance with the teaching of WO 98/52689 before the metering of the alkylene oxides commences.

The DMC catalysts used for the process according to the invention are known and are described, for example, in EP 743 093, EP 755 716, EP 862 947, EP 862 997 or EP 1 021 453. The catalysts may be amorphous or crystalline. Among the crystalline DMC catalysts, preference is given to those having a monoclinic crystal structure.

The catalyst is used preferably in an amount of from 15 to 100 ppm, in particular in an amount of from 20 to 80 ppm, based in each case on the overall composition of the polyether alcohol.

In principle, it is possible to work in stages a) and c) with the same concentration of DMC catalyst. Preference is given to continuing to work in stage c) with the amount of DMC catalyst remaining in the precursor. In a further embodiment, further DMC catalyst may be added to the precursor before step c).

Preference is given to metering the catalyst only once into the first reactor in step a). The amount of catalyst should be such that there is sufficient catalytic activity for both process steps. The catalyst is metered in the form of an about 5% catalyst suspension. The catalyst suspension agent may be, for example, the product from stage a) or that from stage c). The molecular weight of the suspension polyetherol should be identical to or less than the molar mass of the end product of the process.

As detailed, the polyether alcohols prepared by the process according to the invention are preferably used for preparing polyurethanes. In particular, they are used to produce flexible polyurethane foams. A particularly advantageous use of polyether alcohols, prepared by the process according to the invention, having a terminal block of propylene oxide units is for producing flexible slabstock foams. The polyether alcohols prepared by the process according to the invention do not differ in their application properties from those products which have been prepared fully in a batch process or by a batchwise addition of the end block.

The process according to the invention permits in a simple manner the continuous preparation of demanding polyol structures by a continuous preparation process, without there being any disadvantages in the properties of the polyether alcohols. Thus, products prepared by the process according to the invention are substantially odorless and free of volatile compounds.

The polyether alcohols, prepared by the process according to the invention, having an end block of propylene oxide units can be processed without any problems to give fracture-free flexible polyurethane foams having a high open-cell content, preferably of at least 50 dm$^3$/min, more preferably at least 100 dm$^3$/min. It is possible to use the inexpensive and readily available tolylene diisocyanate having an isomer ratio of 80:20, while the expensive tolylene diisocyanate having an isomer ratio of 65:35 has to be used to achieve equal foam properties without the addition of an end block of propylene oxide units.

The thus obtained flexible polyurethane foams can be used in particular in motor vehicle interiors or for the production of furniture and mattresses.

The invention will be described in detail with reference to the examples which follow.

EXAMPLE 1

Comparative

Polyether Alcohol without Propylene Oxide End Block

To disperse the catalyst at the start of the reaction, a polyol catalyzed with potassium hydroxide solution was initially charged. This polyol was prepared by initially charging 17.16 kg of glycerol in a 250 liter reactor. Subsequently, 1.56 kg of 48% potassium hydroxide solution were metered in and the water of reaction was distilled off under reduced pressure at <20 mbar and 120° C. Subsequently, 6.59 kg of diethylene glycol were metered in. Within 5 hours, 226 kg of propylene oxide were added at 125° C. After the postreaction, 13 kg of Macrosorb® MP 5+ and 3.5 kg of water were metered in. The mixture was stirred at 90° C. for one hour, then the water was distilled off down to a water value of less than 0.02% and the Macrosorb® was filtered off through depth filters. The polyol had an OH number of 152.8 mg KOH/g and had an alkalinity of less than 1 ppm.

This polyol, referred to hereinbelow as VP 900, served to disperse the DMC catalyst. 10 kg of VP 900 were initially charged and 1020 g of damp filtercake of a DMC compound prepared according to the teaching of EP 862 947, example 1 were added. The suspension was dispersed by means of an UltraTurrax for approx. 20 min. Subsequently, the suspension was dried under a reduced pressure of 10 mbar for 4 h. The dry suspension had a catalyst content of 5.21% by mass, determined by ICP (Zn and cobalt contents) and calculated via the stoichiometric composition of the catalyst.

A 20 liter reactor was initially charged with 2.5 kg of VP 900 and 0.1085 kg of DMC suspension was metered in. Subsequently, 1.2 kg of glycerol, 0.461 kg of diethylene glycol and 16.026 kg of propylene oxide were metered in in parallel at 120° C. within 5 h. This intermediate was withdrawn from the reactor. For the final synthesis, 6.3 kg of the intermediate prepared were charged into the 20 l reactor and 13.7 kg of propylene oxide and 1.94 kg of ethylene oxide were metered in in parallel at 120° C. within 3 h.

The end product, referred to as VP3000 hereinbelow, had an OH number of 48.2 mg KOH/g and had a DMC content of 92 ppm. The viscosity of the product was 618 mPas.

For the experiments in the continuous reactor system, the DMC catalyst, as above in the case of the VP900, was suspended in VP3000 and the suspension was subsequently dried. The DMC suspension had a DMC content of 5.82% by mass.

The continuous plant consisted of a 1 liter tank which was equipped with separate feeds for starter mixture composed of glycerol:diethylene glycol=2.6:1, based on the mass, alkylene oxides and catalyst suspension. The feeds of the components were via HPLC pumps; the introduction into the reactor was via separate immersed tubes. At the bottom of the reactor, the discharge was controlled using a gear pump with mass flow meter connected downstream. The process control system was used to ensure that the fill level in the reactor was always constant at 90% filling. The product was collected in a 100 l collecting vessel and degassed at 20 mbar. The reaction temperature was 130° C.

VP3000 was initially charged. Subsequently, catalyst suspension was metered in, so that there was a theoretical DMC concentration of 150 ppm in the reactor. The feeds for propylene oxide (0.5239 kg/h) and ethylene oxide (0.0585 kg/h), starter mixture (0.0178 kg/h) and DMC suspension (0.515 g/h) were started, and the metering rates specified were attained after 30 min. The residence time was 100 min. After 20 residence times, the product properties were constant and the product was collected with the following characteristic data:

| | |
|---|---|
| OH number: | 48.1 mg KOH/g |
| DMC content: | 51 ppm |
| Viscosity | 598 mPas |
| Content of prim. OH groups: | 12 mol % |
| Volatile constituents | 15 000 headspace area units |
| Odor | 1.3 |

The collected polyols were subsequently stripped with steam (600 kg of polyol for 4 h with 10 kg/h of steam at a pressure of 160 mbar). Headspace analysis was used to determine the content in the product of volatile secondary components, only the sum of the headspace area units being taken into account. This gave a value of 15 000 area units.

After the stripping, the end product was stabilized with 4000 ppm of Irgastab PUR 68 and foamed.

EXAMPLE 2

Inventive

Polyetherol with 10% Propylene Oxide End Block

The same apparatus was used as in example 1. However, a further stirred tank having a volume of 1 liter was placed downstream of the reactor. The product from the first reactor was reacted here with further propylene oxide. Downstream of the second reactor was installed the degassing unit; the conditions for the degassing corresponded to the settings described in example 1.

VP3000 was initially charged. Subsequently, the catalyst suspension was metered in, so that there was a theoretical DMC concentration of 150 ppm in the reactor. The feeds for propylene oxide (0.4639 kg/h) and ethylene oxide (0.0585 kg/h), the starter mixture described in example 1 (0.0178 kg/h) and DMC suspension (0.515 g/h) were started and the metering rates specified were attained after 30 min. The residence time in the first reactor was 111 minutes. The product from the first tank was passed into the second tank, into which 0.06 kg/h of propylene oxide was metered via an immersed tube, so that there was a residence time of 100 minutes in this tank. Both reactors were operated at 130° C.

After 35 residence times, the product properties were constant and product with the following characteristic data was collected:

| | | |
|---|---|---|
| OH number | 47.2 | mg KOH/g |
| DMC content: | 48 | ppm |
| Viscosity | 591 | mPas |
| Content of prim. OH groups: | 3 | mol % |
| Volatile constituents | 13 500 | headspace area units |
| Odor | 1.3 | |

After the stripping the end product was stabilized with 4000 ppm of Irgastab® PUR 68 and foamed.

Determination of the Odor by the PPU 03/03-04 Test Method of Jan. 15, 2001

100 g of the polyetherol to be investigated are weighed into a new dry glass bottle (250 ml) with screw closure. The odor is determined at 25° C. Before the glass bottle is opened, it is briefly inverted. After the sensory odor test, the glass bottle is again closed tightly. The next test must not take place until after 15 min. Overall, the assessment is effected by 5 fixed, nominated testers The odor is assessed on the following scale:

10—no odor
1.3—barely perceptible odor
1.5—perceptible pleasant odor
1.7—pleasant slightly pungent odor
2.0—slightly unpleasant odor
3.0—unpleasant odor
4.0—highly odorous
5.0—stinks After the odor assessment by 5-7 testers, the odor value is determined by majority decision and documented. When no majority decision can be established, the odor assessment is repeated at a later time. In the event of restricted sensory odor assessment of a tester, such as a cold, the testing is carried out by another nominated tester.

Determination of the Content of Volatile Secondary Constituents

The polyol is initially stabilized with 4000 ppm of BHT. Approx. 3 g of sample are introduced into 10 ml sample bottles which are closed with a high temperature-resistant septum. Subsequently, the sample is placed in the sampler and heated at 140° C. for precisely 2 h. In the course of this, the gas phase (headspace) forms above the liquid. After the heating time, the gas phase is analyzed by means of gas chromatography. The headspace area units are determined by means of flame ionization detectors.

Analysis Conditions:

| | |
|---|---|
| Column: | DB-wax |
| | (0.25 mmID, 0.25 μm film thickness, 30 m) |
| Carrier gas: | helium |
| Combustion gas: | hydrogen and synth. air (optimized) |
| Initial pressure on GC.: | 7.5 psi |
| Flow rate: | 0.5 ml/min |
| Temperature (detector): | 250° C. |
| Temperature (injector): | 150° C. |
| Temperature (oven): | 10 min at 50° C./10°/min → 240° C. for 20 min |
| Split ratio: | 1:20 |
| Bath temperature: | 140° C. (120° C.) |
| Valve/loop temp.: | 150° C. (130° C.) |
| Integration method: | PO 2.MTH |

Production of the Flexible Polyurethane Foams

The starting materials specified in table 1 were reacted in the ratios listed in table 1.

All components apart from the isocyanate, Lupranat® T80A and Desmodur® T65, were initially combined by intensive mixing to give a polyol component. Afterward, the Lupranat® T80 A and, where present, Desmodur® T65 were added with stirring and the reaction mixture was poured into an open mold, in which it foams to give the polyurethane foam. The characteristic data of the resulting foams are listed in table 1.

The following characteristic data have been determined by the standards, working and testing instructions specified:

| | |
|---|---|
| Density in kg/m³ | DIN EN ISO 845 |
| VOC of ricinoleic acid cycle in ppm | PB VWL 709 |
| FOG of ricinoleic acid cycle in ppm | PB VWL 709 |
| Air flow value in dm³/min | DIN EN ISO 7231 |
| Compression hardness, 40% deformation in kPa | DIN EN ISO 2439 |
| Elongation in % to | DIN EN ISO 1798 |
| Tensile strength in kPa | DIN EN ISO 1798 |
| Rebound resilience in % | DIN EN ISO 8307 |
| Compressive set in % | DIN EN ISO 3386 |

TABLE 1

| | OHN | Example 3 (C) | Example 4 (C) | Example 5 |
|---|---|---|---|---|
| Polyetherol, as per example 1 | 48.1 | 100.00 | 100.00 | |
| Polyetherol, as per example 2 | 47.2 | | | 100.00 |
| Tegoamin ® B4900 | 0 | 1.00 | 1.00 | 1.00 |

TABLE 1-continued

|  | OHN | Example 3 (C) | Example 4 (C) | Example 5 |
| --- | --- | --- | --- | --- |
| Niax ® A1 | 560 | 0.05 | 0.05 | 0.05 |
| Dabco ® 33LV | 425.8 | 0.15 | 0.15 | 0.15 |
| Kosmos ® 29 | 0 | 0.20 | 0.20 | 0.20 |
| Water (additional) | 6233 | 3.80 | 3.80 | 3.80 |
| Lupranat ® T80A index |  | 113 |  | 113 |
| Lupranat ® T80A:Desmodur ® T65 1:1 index |  |  | 113 |  |
| Comment |  |  |  |  |
| Cream time in s |  | 9 | 9 | 11 |
| Fiber time in s |  | 85 | 85 | 90 |
| Rise time in s |  | 90 | 90 | 95 |
| Air flow valve in dm$^3$/min |  | 38 | 150 | 154 |
| Density in kg/m$^3$ |  | 24.8 | 24.5 | 24.7 |
| Tensile strength in kPa |  | 71 | 89 | 95 |
| Elongation in % |  | 76 | 99 | 119 |
| Compression hardness: 40% deformation in kPa |  | 4.7 | 4.2 | 4.1 |
| Compressive set in % |  | 4.0 | 3.5 | 2.0 |
| Rebound resilience in % |  | 39 | 41 | 45 |
| Appearance |  | fine cells | fine cells | fine cells |
| Fractures |  | channels | none | none |

What is claimed is:

1. A continuous process for producing a polyether alcohol having first and terminal polyalkylene oxide blocks, comprising:
   (1) continuously metering one or a mixture of H-functional starter substances, a first alkylene oxide or first mixture of alkylene oxides, and a DMC catalyst into a first reactor;
   (2) continuously reacting said one or mixture of H-functional starter substances and said first alkylene oxide or first mixture of alkylene oxides in the presence of said DMC catalyst in said first reactor to produce a polyether alcohol precursor with a first polyalkylene oxide block;
   (3) continuously withdrawing said polyether alcohol precursor from said first reactor;
   (4) continuously metering said precursor and a different alkylene oxide or a different mixture of alkylene oxides from that in the first reactor into a second reactor;
   (5) continuously reacting said precursor and said different alkylene oxide or a different mixture of alkylene oxides in said second reactor; and
   (6) continuously withdrawing polyether alcohol with first and terminal polyalkylene oxide blocks from the second reactor;
   wherein 50 to 98% of the total amount of alkylene oxide added to the first and second reactors is added to the first reactor and the polyether alcohol product having first and terminal polyalkylene oxide blocks produced has an hydroxyl number of 35 to 60 mgKOH/g and a content of primary alcohol groups of less than 12 mol % but not less than 3 mol %.

2. The continuous process of claim 1, wherein the terminal polyalkylene oxide block is a block of propylene oxide units.

3. The continuous process of claim 1, wherein the terminal polyalkylene oxide block is a block of ethylene oxide units.

4. The continuous process of claim 1, wherein the DMC catalyst is used in an amount from 15 to 100 ppm based on the overall composition of polyether alcohol produced.

5. The continuous process of claim 1, wherein the DMC catalyst is used in an amount from 20 to 80 ppm based on the overall composition of polyether alcohol produced.

6. The continuous process of claim 1, wherein the first alkylene oxide or first mixture of alkylene oxides in the first reactor is a mixture of ethylene oxide and propylene oxide and the different alkylene oxide or different mixture of alkylene oxides in the second reactor is propylene oxide.

7. The continuous process of claim 1, wherein the first alkylene oxide or first mixture of alkylene oxides in the first reactor is propylene oxide and the different alkylene oxide or different mixture of alkylene oxides in the second reactor is a mixture of ethylene oxide and propylene oxide.

8. The continuous process of claim 1, wherein the first alkylene oxide or first mixture of alkylene oxides in the first reactor is a mixture of ethylene oxide and propylene oxide and the different alkylene oxide or different mixture of alkylene oxides in the second reactor is a different mixture of ethylene oxide and propylene oxide.

9. The continuous process of claim 1, wherein the first alkylene oxide or first mixture of alkylene oxides in the first reactor is a mixture of ethylene oxide and propylene oxide having a ratio of propylene oxide to ethylene oxide of from 30:70 to 98:2.

10. The continuous process of claim 1, wherein the first and second reactors are continuously stirred tanks.

11. The continuous process of claim 1, wherein the first reactor is a continuously stirred tank and the second reactor is a tubular reactor.

12. A polyether alcohol prepared by the process of claim 1.

13. In a process for preparing flexible polyurethane foams comprising reacting polyisocyanates with compounds having at least two hydrogen atoms reactive with isocyanate groups, the improvement wherein the compound having at least two hydrogen atoms reactive with isocyanate groups is a polyether alcohol produced by the process of claim 1.

14. The continuous process of claim 1, wherein the polyether alcohol produced having first and terminal polyalkylene blocks has a content of primary OH groups of 3 mol %.

15. The continuous process of claim 6, wherein the polyether alcohol produced having first and terminal polyalkylene blocks has a content of primary OH groups of 3 mol %.

16. The continuous process of claim 1, wherein 80 to 98% of the total amount of alkylene oxide added to the first and second reactors is added to the first reactor.

17. The continuous process of claim 1, wherein 83 to 97% of the total amount of alkylene oxide added to the first and second reactors is added to the first reactor.

* * * * *